United States Patent [19]
Fulmer

[11] 4,152,952
[45] May 8, 1979

[54] BRAKE PEDAL LINKAGE MECHANISM
[75] Inventor: Keith H. Fulmer, Mishawaka, Ind.
[73] Assignee: The Bendix Corporation, Southfield, Mich.
[21] Appl. No.: 861,791
[22] Filed: Dec. 19, 1977
[51] Int. Cl.$^2$ ............................................. G05G 1/04
[52] U.S. Cl. ................................................... 74/517
[58] Field of Search ................ 74/512, 513, 514, 516, 74/517, 518, 478, 478.5

[56] References Cited
U.S. PATENT DOCUMENTS

| | | | |
|---|---|---|---|
| 2,893,139 | 7/1959 | Fryer | 74/516 |
| 3,142,199 | 7/1964 | Burton et al. | 74/516 |
| 3,646,831 | 3/1972 | Janosi | 74/518 |

FOREIGN PATENT DOCUMENTS

673716 10/1929 France ............................ 74/518

*Primary Examiner*—Kenneth J. Dorner
*Attorney, Agent, or Firm*—Leo H. McCormick, Jr.; Ken C. Decker

[57] ABSTRACT

A brake pedal assembly including a pedal lever which is pivotally attached to a housing, a plate pivotally attached to the pedal lever, a push rod attached to said plate, and a pulley arrangement. The cable has a fixed length with a first end attached to the pedal lever and a second end attached to the plate. An operator input applied to the pedal lever moves the pedal lever in an arc about the pivotal attachment of the housing. As the pedal lever moves, the cable length between the pulley mechanism and the first end increases while the length between the pulley mechanism and the second end decreases. A decrease in the length of the cable between the second end and the pulley causes the plate to pivot with respect to the pedal lever. The arcuate movement of the first lever and the pivoting of the plate are combined to provide a push rod with linear movement for actuating a force receiver.

3 Claims, 2 Drawing Figures

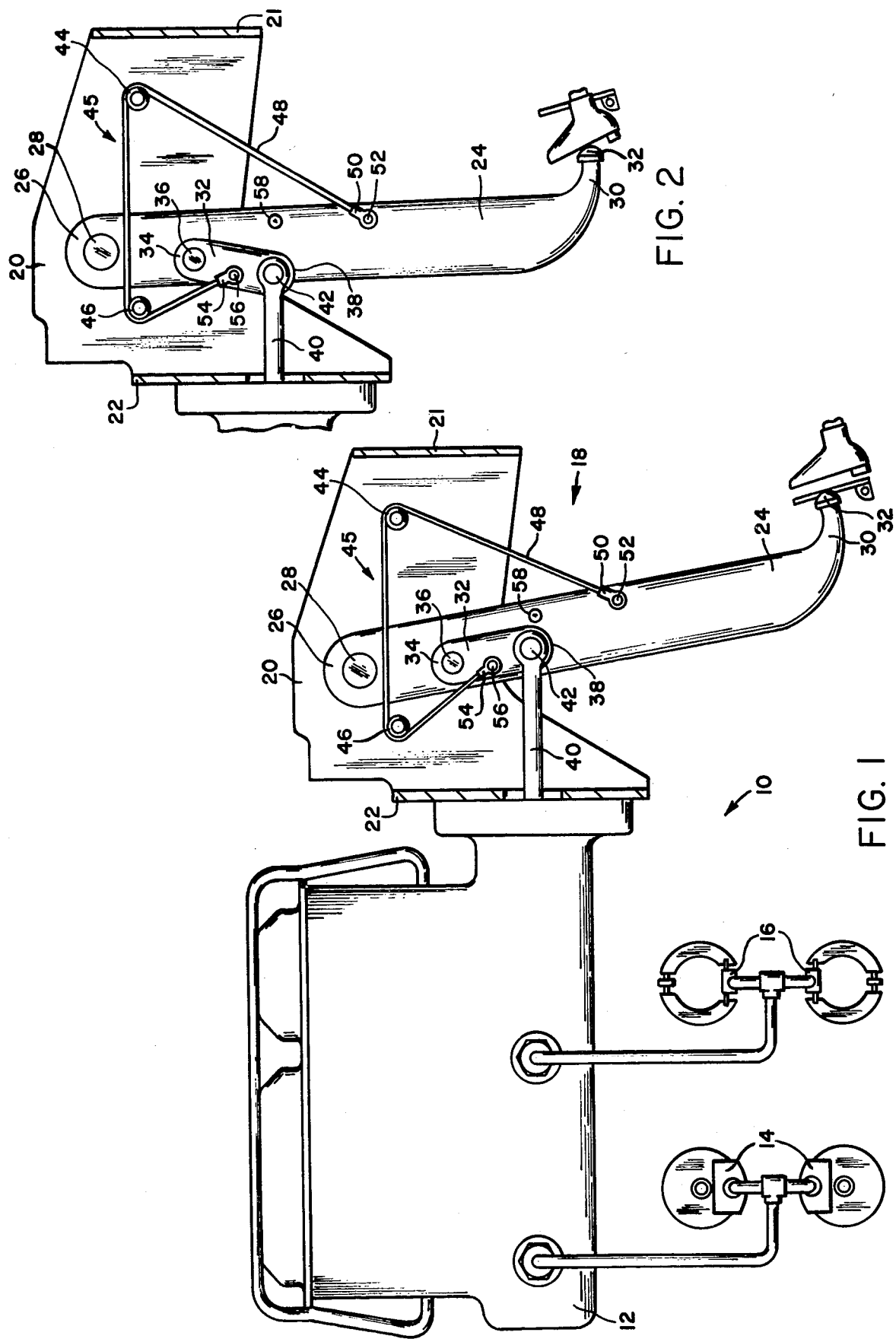

BRAKE PEDAL LINKAGE MECHANISM

BACKGROUND OF THE INVENTION

This invention relates to a brake pedal assembly for providing a master cylinder with an operational input to effect a brake application.

In brake systems of most motor vehicles, a certain amount of lost motion occurs in moving the brake shoes or brake pad into engagement with the brake drum or rotors. The brake pedal movement required to bring the brake systems into operation can account for as much as one third of the total operational stroke of a brake pedal. If the height of the brake pedal with respect to the floor of a vehicle is increased to compensate for additional pedal movement, an operator is required to raise his foot to a different height than the accelerator to move the brake pedal rather than merely rotating the foot from the accelerator to the brake pedal as now experienced by most drivers in currently produced vehicles.

Several attempts have been made to develop brake pedal linkages which change the ratio movement of an output push rod as compared to the brake pedal such as the toggle linkage disclosed in U.S. Pat. No. 3,142,199, the lever and diaphragm arrangement disclosed in U.S. Pat. No. 3,263,428, the slotted lever disclosed in U.S. Pat. No. 3,063,427, the resiliently positioned levers in U.S. Pat. No. 3,633,366 and the lever and cam arrangement disclosed in U.S. Pat. No. 3,646,831. The disadvantage in many of these prior art brake pedals is the numerous parts required to cofunction to produce a variance in the movement of the output push rod as compared to the input movement of a brake pedal.

In copending U.S. patent application Ser. No. 830,923 a brake pedal arrangement having a lever positioned by a cam is disclosed for providing a push rod with varying movement to rapidly bring the components in a brake system to an operational condition without an increase in the currently available brake pedal travel while allowing the brake pedal and accelerator to remain in substantially the same plane with respect to the foot of the operator.

SUMMARY OF THE INVENTION

I have devised a brake pedal arrangement having a pulley-cable mechanism for rotating a linkage mechanism on a brake pedal to provide a push rod with a variable rate of travel in response to a uniform rate of arcuate movement by the brake pedal in response to an operator input.

The brake pedal arrangement has a brake lever with a first end pivotally attached to a housing and a second end which is free to rotate in an arc about the first end. A plate pivotally attached to the brake lever is connected to a push rod. First and second pulley wheels are fixed to the housing on opposite sides of the brake lever. A cable connected to the first and second pulley wheels has a first end connected to the brake pedal and a second end connected to the plate. An operator applied input to the second end of the brake lever moves the brake lever and plate in an arc about the first end of the brake lever. As the brake lever moves the cable length between the first end and the first pulley wheel increases which the cable length between the second end and the second pulley wheel correspondingly decreases causing the plate to rotate with respect to the brake pedal. The rotation of the plate and the arcuate movement of the brake pedal provides the push rod with linear movement to operate a master cylinder system and effect a brake application.

It is an object of this invention to provide a brake system with a linkage arrangement through which a uniform rate of arcuate movement of a brake pedal is modified by a pulley mechanism to provide a push rod with a variable rate of linear movement.

It is another object of this invention to provide a push rod attached to aplate pivotally carried on a brake pedal with linear movement derived by combining the arcuate movement of the brake pedal with rotative movement of the plate.

These and other objects of this invention should be apparent from reading this specification while viewing the drawings.

BRIEF DESCRIPTION OF THE DRAWING

FIG. 1 is a schematic illustration of a brake system including a brake pedal arrangement made according to the principles of this invention; and FIG. 2 is an illustration of the brake pedal showing the relative movement of the linkage plate and the brake pedal resulting from the pulley arrangment of this invention.

DETAILED DESCRIPTION OF THE INVENTION

In the brake system 10 shown in FIG. 1 has a master cylinder 12 connected to the front and rear wheel brakes 14 and 16, respectively, of a vehicle. The master cylinder 12 responds to an operator input applied to a brake pedal assembly 18 and supplies the front and rear wheel brakes 14 and 16 with fluid pressure to effect a brake application.

The brake pedal assembly 18 has a housing or hanger member 20 which is located between the dash 21 and firewall 22 of a vehicle for positioning a brake lever 24 in the driver compartment. The brake lever 24 has a first end 26 and a second end 30. The first end 26 is pivotally mounted on pin 28 which is fixed to the housing 20. A pad 32 attached to the second end 30 provides a surface through which an operator can apply an input force for moving the brake lever 24 in an arc about pin 28.

A lever or plate 32 has a first end 34 pivotally located on pin 36 attached to brake pedal 24, and a second end 38. Second end 38 is connected to push rod 40 by pin 42 attached to lever 32. A return spring in the master cylinder 12 acts on push rod 40 to position end 38 of lever 32 against a positive stop 58 when the pedal 24 is in the rest position, as shown in FIG. 1.

A linkage or pulley system 45 connects the lever or plate 32 with the brake pedal 24. The pulley system includes a first sheave 44 which is attached to housing 20 on one side of the brake pedal 24, a second sheave 46 which is attached to the housing 20 on the opposite side of the brake pedal 24, and a cable 48. Cable 48 has a first connector end 50 attached to the brake pedal 24 by pin 52 and a second connector end 54 attached to lever or plate 32 by a pin 56.

MODE OF OPERATION OF THE INVENTION

When a vehicle operator desires to effect a brake application, an input force is applied to pad 32 by the operator. The input force applied to pad 32 causes brake lever 24 to rotate in an arc about pin 28. As brake lever 24 rotates, the arcuate distance traversed by pin 52 is greater than the arcuate distance traversed by pin 56 causing the distance between pin 52 and sheave 44 to change faster than the distance between pin 56 and sheave 46. Since the length of cable is fixed, the change in cable length between pin 52 and sheave 44 causes lever or plate 32 to rotate about pin 36 as shown in FIG. 2. Thus, the input force applied to pad 32 is modified and the linear movement of push rod 40 is derived by combining the arcuate movement of brake lever 24 with the rotative movement of lever or plate 32 by the pulley arrangement 45.

Upon termination of the input force on pad 32, the return spring in the master cylinder moves the lever or plate 32 against stop pin 58 to return the brake lever 24 to the rest position shown in FIG. 1.

Should a malfunction occur in the pulley system 45, such as a break in cable 48, lever or plate 32 immediately engages stop pin 58 and the input force applied to pad 32 is directly transmitted into such rod 40 without modification.

I claim:

1. A linkage mechanism for moving an output member at a variable rate in response to uniform movement of an input member, comprising:
    a housing;
    a first lever having a first end pivotally attached to said housing and a second end;
    a second lever pivotally attached to said first lever;
    a push rod pivotally attached to said second lever;
    sheave means attached to said housing; and
    a cable having a fixed length and being connected to said sheave means, said cable having a first end secured to said first lever and a second end secured to said second lever, said first lever moving in an arc about said first end in response to an input force applied to said second end of the first lever, said first end of said cable moving with said first lever causing changes in the length of cable between said first and second ends of the cable and the sheave means, the change in cable length between the sheave means and said second end of the cable causing the second lever to rotate on said first lever and provide said push rod with linear movement, said linear movement being a function of both the arcuate movement of said first lever and the rotative movement of said second lever.

2. The linkage mechanism, as recited in claim 1, wherein said sheave means includes:
    a first roller located on one side of said first lever; and
    a second roller located on the other side of the first lever, said cable passing around said first and second rollers before said first and second ends are secured to said first and second levers, respectively.

3. The linkage mechanism, as recited in claim 2, further including:
    stop means attached to said first lever and adapted to engage said second lever and move said push rod with said first lever should a malfunction occur in said cable.

* * * * *